US012722379B2

(12) United States Patent
Niimi et al.

(10) Patent No.: US 12,722,379 B2
(45) Date of Patent: Sep. 1, 2026

(54) WARMING DEVICE CAPABLE OF DETERMINING LOWERING OF WARMING FUNCTION, IMAGE FORMING APPARATUS, AND DETERMINATION METHOD

(71) Applicant: KYOCERA Document Solutions Inc., Osaka (JP)

(72) Inventors: Yuna Niimi, Osaka (JP); Takuma Araki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 266 days.

(21) Appl. No.: 18/763,458

(22) Filed: Jul. 3, 2024

(65) Prior Publication Data

US 2025/0010623 A1 Jan. 9, 2025

(30) Foreign Application Priority Data

Jul. 7, 2023 (JP) ................................. 2023-111865

(51) Int. Cl.

*B41J 2/175* (2006.01)
*F24H 15/104* (2022.01)
*F24H 15/223* (2022.01)
*F24H 15/248* (2022.01)
*G01F 23/30* (2006.01)
*G01K 1/02* (2021.01)

(52) U.S. Cl.

CPC ............ *B41J 2/175* (2013.01); *F24H 15/104* (2022.01); *F24H 15/223* (2022.01); *F24H 15/248* (2022.01); *G01F 23/30* (2013.01); *G01K 1/026* (2013.01)

(58) Field of Classification Search

None
See application file for complete search history.

(56) References Cited

U.S. PATENT DOCUMENTS

2018/0207940 A1* 7/2018 Yoda .................... B41J 2/04581
2022/0018574 A1 1/2022 Inui et al.
2023/0026405 A1* 1/2023 Kishida .................... B41J 2/125
2023/0256743 A1* 8/2023 Yoda .......................... B41J 2/01 347/6
2023/0364920 A1* 11/2023 Kurosu ................ B41J 2/17553

FOREIGN PATENT DOCUMENTS

JP 2022018871 A 1/2022

* cited by examiner

*Primary Examiner* — Suman K Nath
(74) *Attorney, Agent, or Firm* — Alleman Hall LLP

(57) ABSTRACT

A warming device includes a corrugated tube, a storing portion, a heater, a water level sensor, and a determination processing portion. The corrugated tube includes a spiral portion that is formed spirally. The storing portion stores the spiral portion and a liquid heating medium used for warming the spiral portion. The heater heats the storing portion. The water level sensor detects a water level of the heating medium in the storing portion. The determination processing portion determines, based on a detection water level detected by the water level sensor, whether or not the heating medium is in a heating medium shortage state where a storage amount of the heating medium in the storing portion falls below a predetermined lower limit amount.

8 Claims, 11 Drawing Sheets

START
S11
ACQUIRE STORAGE AMOUNT
S12
NOTIFY STORAGE AMOUNT
S13
REACHED TARGET TEMPERATURE ?
Yes
No
S14
EXCEEDED UPPER LIMIT TEMPERATURE ?
No
Yes
S15
STOP DRIVE
S16
NOTIFY STOP OF DRIVE
END

FIG.9

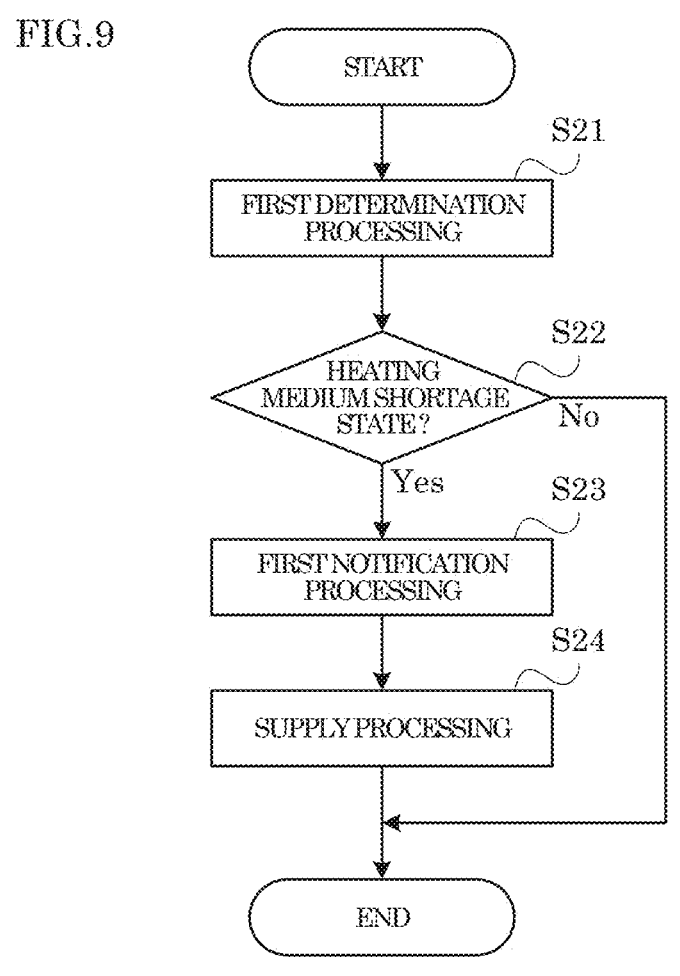

START

S21

FIRST DETERMINATION PROCESSING

S22

HEATING MEDIUM SHORTAGE STATE?

No

Yes

S23

FIRST NOTIFICATION PROCESSING

S24

SUPPLY PROCESSING

END

WARMING DEVICE CAPABLE OF DETERMINING LOWERING OF WARMING FUNCTION, IMAGE FORMING APPARATUS, AND DETERMINATION METHOD

INCORPORATION BY REFERENCE

This application is based upon and claims the benefit of priority from the corresponding Japanese Patent Application No. 2023-111865 filed on Jul. 7, 2023, the entire contents of which are incorporated herein by reference.

BACKGROUND

The present disclosure relates to a warming device, an image forming apparatus, and a determination method.

An image forming apparatus that uses an inkjet system is provided with a warming device which warms ink. For example, there is known a warming device including a metal plate heated by a heater and piping arranged in contact with the metal plate.

SUMMARY

A warming device according to an aspect of the present disclosure includes a corrugated tube, a storing portion, a heater, a water level sensor, and a determination processing portion. The corrugated tube includes a spiral portion that is formed spirally. The storing portion stores the spiral portion and a liquid heating medium used for warming the spiral portion. The heater heats the storing portion. The water level sensor detects a water level of the heating medium in the storing portion. The determination processing portion determines, based on a detection water level detected by the water level sensor, whether or not the heating medium is in a heating medium shortage state where a storage amount of the heating medium in the storing portion falls below a predetermined lower limit amount.

An image forming apparatus according to another aspect of the present disclosure includes the warming device and forms an image using ink warmed by the warming device.

A determination method according to another aspect of the present disclosure is executed in a warming device including a corrugated tube including a spiral portion that is formed spirally, a storing portion which stores the spiral portion and a liquid heating medium used for warming the spiral portion, a heater which heats the storing portion, and a water level sensor which detects a water level of the heating medium in the storing portion, and includes a determination step. The determination step includes determining, based on a detection water level detected by the water level sensor, whether or not the heating medium is in a heating medium shortage state where a storage amount of the heating medium in the storing portion falls below a predetermined lower limit amount.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 9 is a flowchart showing an example of second operation control processing executed in the image forming apparatus according to the second embodiment of the present disclosure;

DETAILED DESCRIPTION

Hereinafter, embodiments of the present disclosure will be described with reference to the attached drawings. It is noted that the following embodiments are each an example of embodying the present disclosure and do not limit the technical scope of the present disclosure.

First Embodiment

Figure 1:
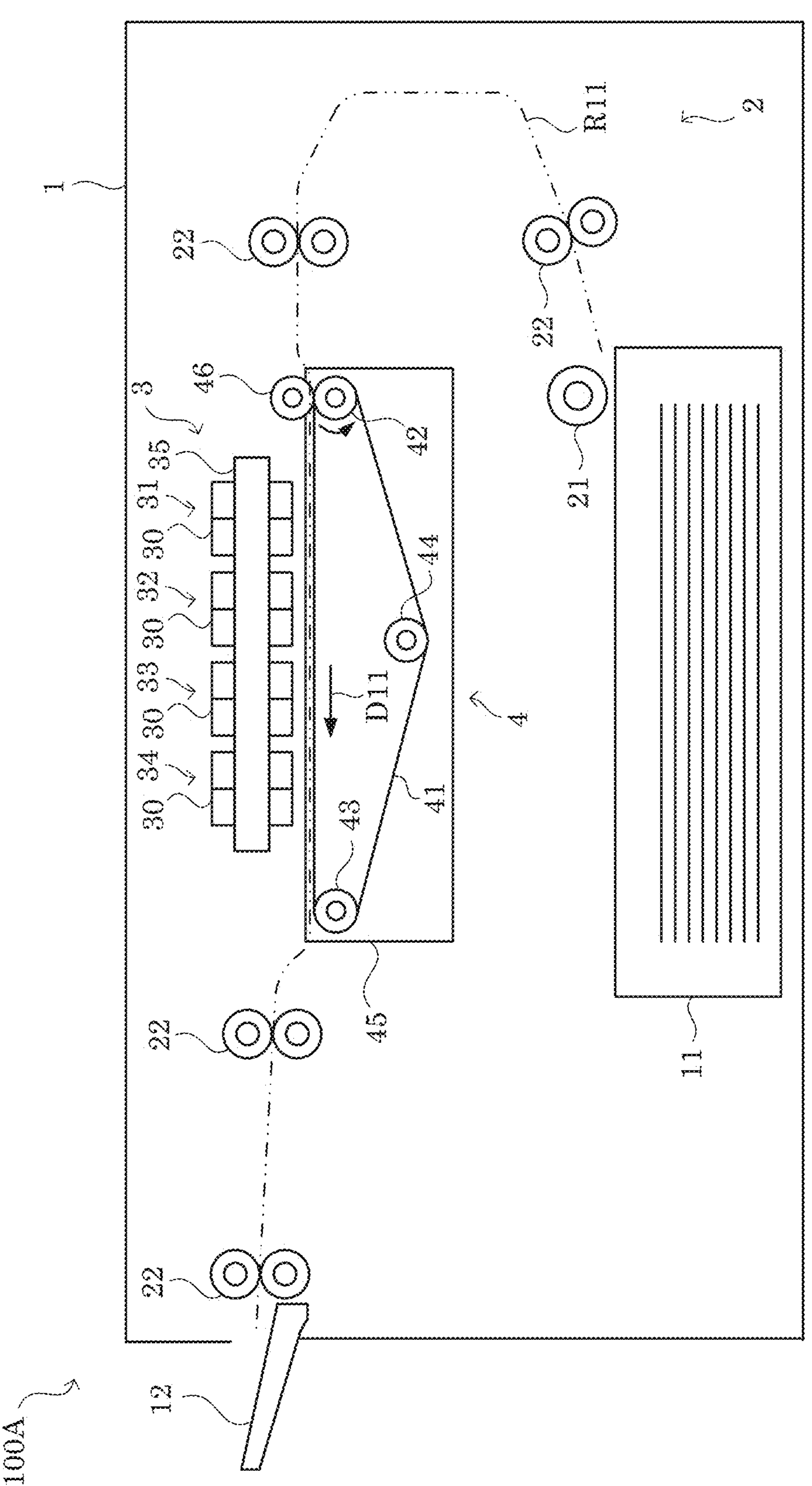
FIG. 1 is a diagram showing a configuration of an image forming apparatus according to a first embodiment of the present disclosure.
Figure 2:
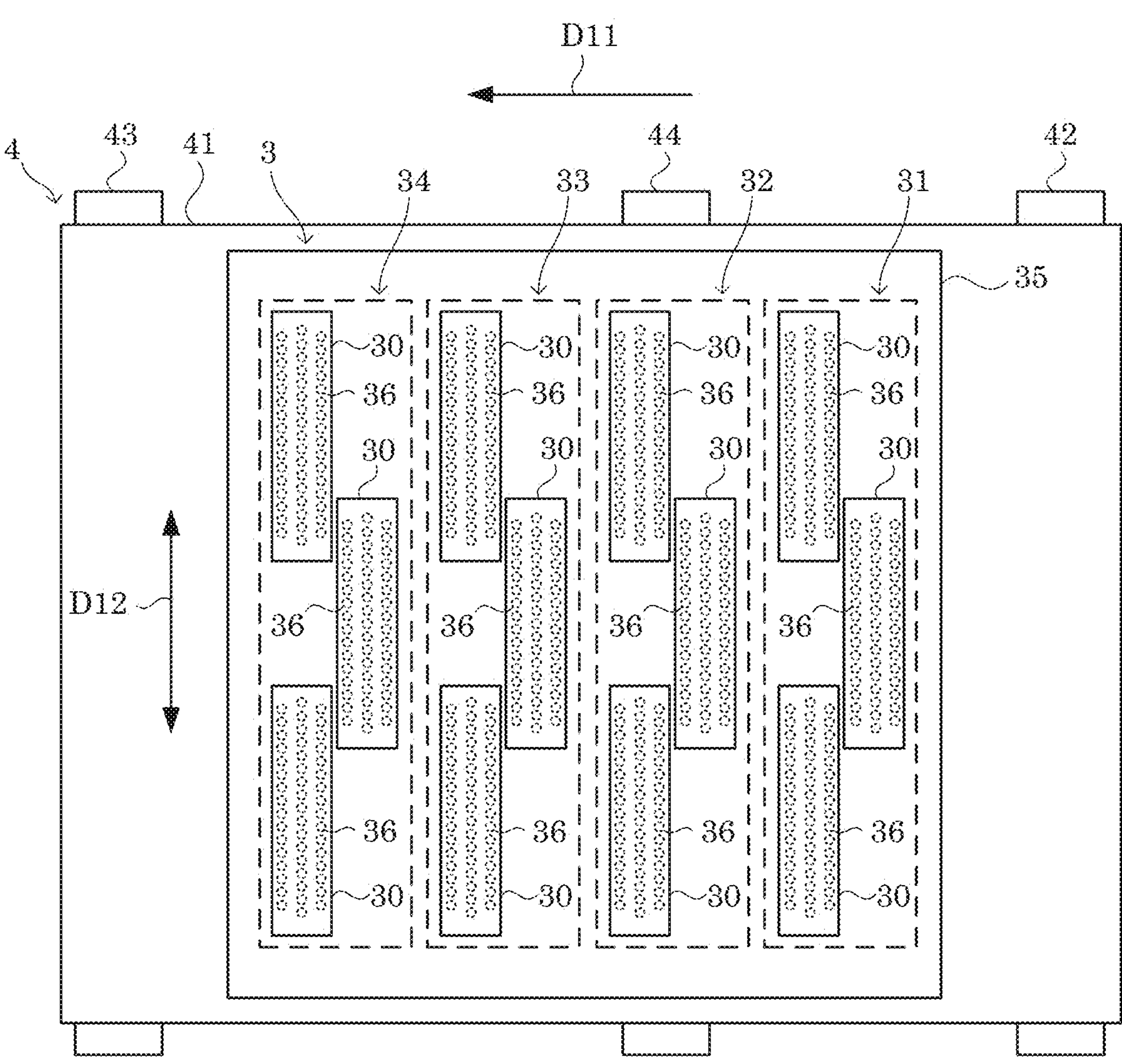
FIG. 2 is a diagram showing configurations of an image forming portion and a conveying unit of the image forming apparatus according to the first embodiment of the present disclosure.

First, a configuration of an image forming apparatus 100A according to a first embodiment of the present disclosure will be described with reference to FIG. 1 to FIG. 3. Herein, FIG. 1 is a cross-sectional view showing the configuration of the image forming apparatus 100A. Further, FIG. 2 is a plan view showing configurations of an image forming portion 3 and a conveying unit 4. It is noted that in FIG. 1, a sheet conveying path R11 is indicated by a dash-dot-dot line.

The image forming apparatus 100A is a printer that is capable of forming an image on a sheet using an inkjet system. It is noted that the present disclosure may also be applied to image forming apparatuses such as a facsimile apparatus, a copying machine, and a multifunction peripheral that are capable of forming an image on a sheet using the inkjet system.

Figure 3:
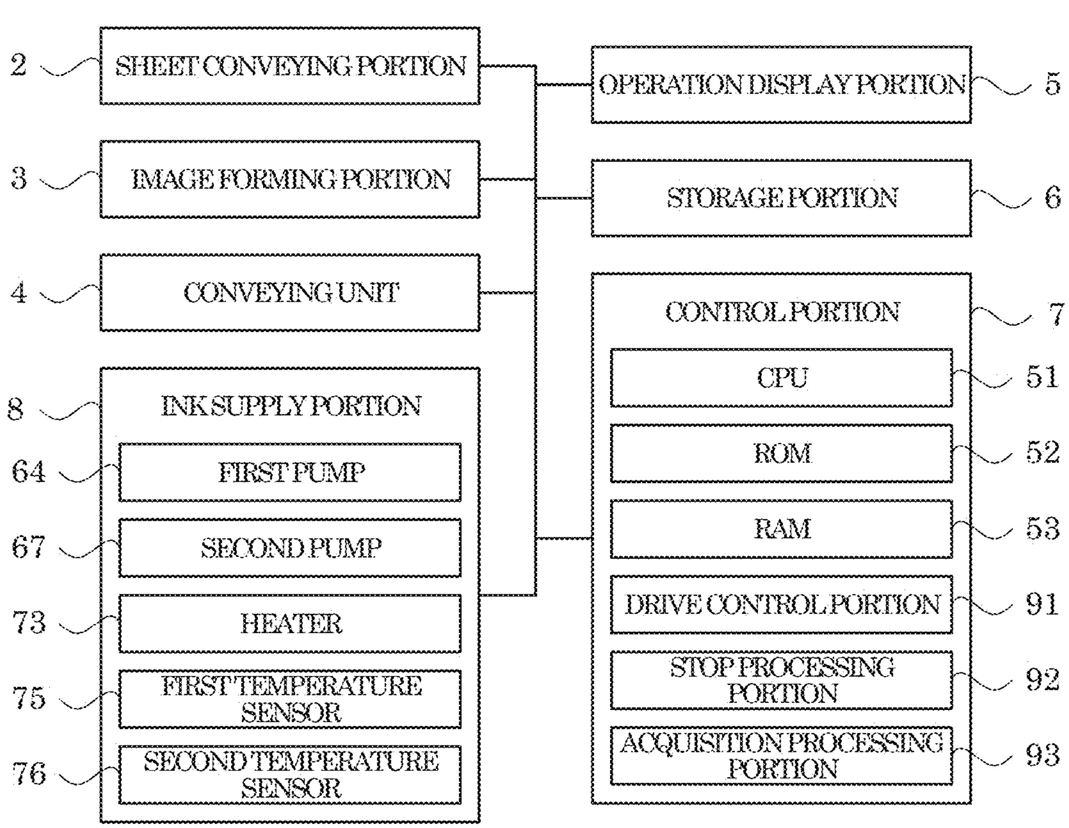
FIG. 3 is a block diagram showing a system configuration of the image forming apparatus according to the first embodiment of the present disclosure.

As shown in FIG. 1 and FIG. 3, the image forming apparatus 100A includes a housing 1, a sheet conveying portion 2, the image forming portion 3, the conveying unit 4, an operation display portion 5, a storage portion 6, a control portion 7, and an ink supply portion 8.

The housing 1 houses respective constituent elements of the image forming apparatus 100A. A sheet feed cassette 11 is detachably provided in the housing 1. Sheets on which images are to be formed are stored in the sheet feed cassette 11. A sheet discharge tray 12 is provided on an outer side surface of the housing 1. A sheet on which an image has been formed by the image forming portion 3 is discharged onto the sheet discharge tray 12. Inside the housing 1, a sheet stored in the sheet feed cassette 11 is conveyed along the sheet conveying path R11 that reaches the sheet discharge tray 12 (see FIG. 1) via an image forming position of the image forming portion 3.

The sheet conveying portion 2 conveys the sheet stored in the sheet feed cassette 11 along the sheet conveying path R11 (see FIG. 1). As shown in FIG. 1, the sheet conveying portion 2 includes a pickup roller 21 and a plurality of conveying rollers 22. The pickup roller 21 picks up an uppermost sheet out of a sheaf of sheets stored in the sheet feed cassette 11 and feeds the sheet to the sheet conveying path R11. The plurality of conveying rollers 22 are provided while being arranged along the sheet conveying path R11. Each of the plurality of conveying rollers 22 conveys the sheet along the sheet conveying path R11. Each of the plurality of conveying rollers 22 conveys the sheet in a conveying direction D11 (see FIG. 1) directed from the sheet feed cassette 11 toward the sheet discharge tray 12.

The image forming portion 3 forms an image that is based on image data on a sheet supplied from the sheet conveying portion 2. As shown in FIG. 1, the image forming portion 3 includes line heads 31 to 34 and a head frame 35.

As shown in FIG. 2, each of the line heads 31 to 34 is elongated in a width direction D12 orthogonal to the conveying direction D11. Specifically, each of the line heads 31 to 34 has, in the width direction D12, a length corresponding to a width of a sheet of a maximum size out of the sheets that can be stored in the sheet feed cassette 11. The line heads 31 to 34 are provided next to one another at regular intervals along the conveying direction D11.

As shown in FIG. 2, each of the line heads 31 to 34 includes a plurality of recording heads 30. The recording head 30 ejects ink toward the sheet conveyed by the conveying unit 4. Specifically, a large number of nozzles 36 (see FIG. 2) used for ejecting the ink are provided on an opposing surface of the recording head 30 that opposes the sheet. Each of the recording heads 30 provided in the line head 31 ejects the ink of black. Each of the recording heads 30 provided in the line head 32 ejects the ink of cyan. Each of the recording heads 30 provided in the line head 33 ejects the ink of magenta. Each of the recording heads 30 provided in the line head 34 ejects the ink of yellow.

In the present embodiment, in the line head 31, three recording heads 30 are arranged in a staggered pattern along the width direction D12. In addition, also in each of the other line heads 32 to 34, three recording heads 30 are arranged in a staggered pattern along the width direction D12 similar to the line head 31. It is noted that FIG. 2 shows a state where the image forming portion 3 is seen from the upper side in FIG. 1.

The head frame 35 supports the line heads 31 to 34. The head frame 35 is supported by the housing 1. It is noted that the number of line heads to be provided in the image forming portion 3 only needs to be one or more. In addition, the number of recording heads 30 to be provided in each of the line heads 31 to 34 does not need to be limited to three.

As shown in FIG. 1, the conveying unit 4 is arranged below the line heads 31 to 34. The conveying unit 4 conveys the sheet while the sheet opposes the recording heads 30. For example, the conveying unit 4 conveys the sheet by a predetermined conveying amount every time the ink is ejected by the recording heads 30. In addition, the conveying unit 4 stops conveying the sheet while the ejection of the ink is performed by the recording heads 30. As shown in FIG. 1, the conveying unit 4 includes a conveying belt 41 on which the sheet is to be placed, a first tension roller 42, a second tension roller 43, and a third tension roller 44 across which the conveying belt 41 is stretched, and a conveying frame 45 that supports these members. It is noted that a gap between the conveying belt 41 and the recording heads 30 is adjusted such that a gap between a front surface of a sheet and the recording heads 30 during image formation becomes a predetermined distance (for example, 1 mm).

The first tension roller 42 is rotationally driven by a rotational driving force supplied from a motor (not shown). Thus, the conveying belt 41 rotates in a direction in which the sheet can be conveyed in the conveying direction D11 (see FIG. 1). It is noted that the conveying unit 4 is also provided with a suction unit (not shown) which sucks in air from a plurality of through-holes formed in the conveying belt 41 so as to cause the sheet to stick to the conveying belt 41, or the like. In addition, a pressure roller 46 for conveying the sheet while pressing the sheet against the conveying belt 41 is provided above the first tension roller 42.

The operation display portion 5 is a user interface of the image forming apparatus 100A. The operation display portion 5 includes a display portion and an operation portion. The display portion displays various types of information in response to control instructions from the control portion 7. The display portion is, for example, a liquid crystal display. The operation portion is used for inputting various types of information to the control portion 7 according to user operations. The operation portion is, for example, a touch panel. The operation display portion 5 is provided on an upper surface of the housing 1.

The storage portion 6 is a nonvolatile storage device. For example, the storage portion 6 is a nonvolatile memory such as a flash memory. It is noted that the storage portion 6 may alternatively be an SSD (Solid State Drive) or an HDD (Hard Disk Drive).

The control portion 7 collectively controls the image forming apparatus 100A. As shown in FIG. 3, the control portion 7 includes a CPU 51, a ROM 52, and a RAM 53. The CPU 51 is a processor which executes various types of calculation processing. The ROM 52 is a nonvolatile storage device in which information such as control programs for causing the CPU 51 to execute various types of processing is stored in advance. The RAM 53 is a volatile or nonvolatile storage device used as a temporary storage memory (working area) for the various types of processing to be executed by the CPU 51. The CPU 51 executes the various control programs stored in advance in the ROM 52 to collectively control the image forming apparatus 100A. It is noted that the control portion 7 may be a control portion provided separate from a main control portion which collectively controls the image forming apparatus 100A. Further, the control portion 7 may be configured by an electronic circuit such as an integrated circuit (ASIC).

[Configuration of Ink Supply Portion 8]

Next, a configuration of the ink supply portion 8 will be described with reference to FIG. 4. It is noted that in FIG. 4, a first supply path 62 and a second supply path 66 are indicated by bold lines.

The ink supply portion 8 supplies the ink to the recording heads 30. The ink supply portion 8 is provided for each of the recording heads 30. It is noted that the configurations of the plurality of ink supply portions 8 corresponding to the line heads 31 to 34 are the same except that the colors of the ink to be supplied differ.

Figure 4:
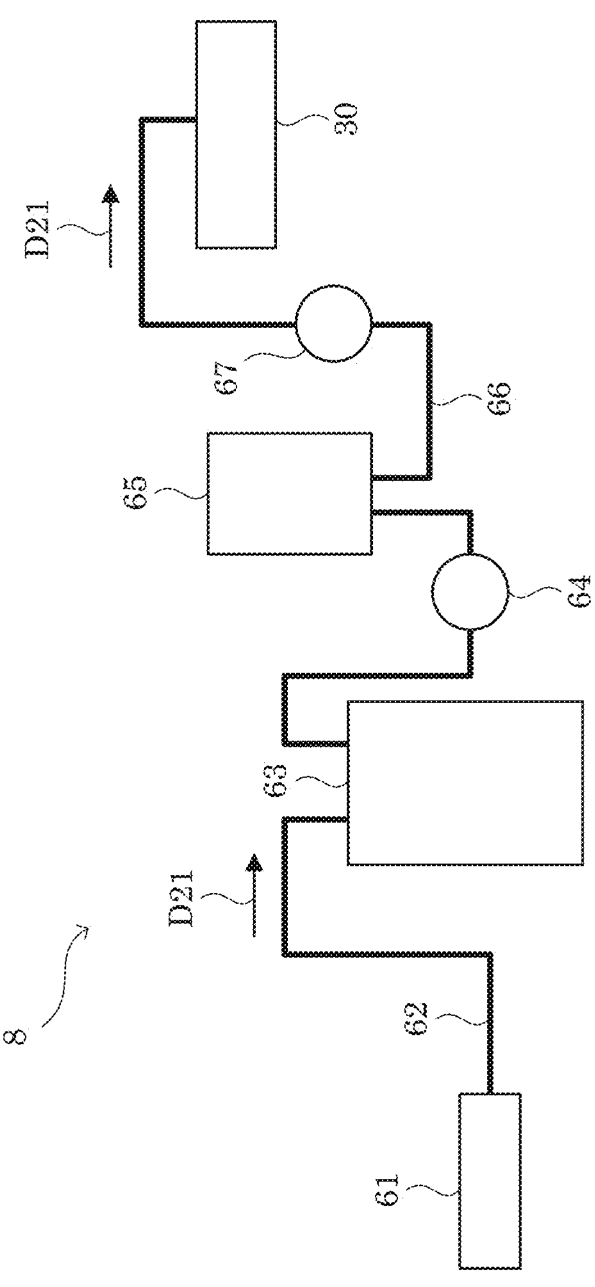
FIG. 4 is a diagram showing a configuration of an ink supply portion of the image forming apparatus according to the first embodiment of the present disclosure.

As shown in FIG. 4, the ink supply portion 8 includes an ink container 61, the first supply path 62, a warming device 63, a first pump 64, a sub ink tank 65, the second supply path 66, and a second pump 67.

The ink container 61 stores the ink. For example, the ink is aqueous ink that contains water as a main solvent. It is noted that the ink may alternatively be non-aqueous ink that contains an organic solvent or the like as the main solvent.

The first supply path 62 is an ink flow path provided between the ink container 61 and the sub ink tank 65. The first supply path 62 is formed of a material having flexibility. For example, the first supply path 62 is a tube formed of a resin.

The warming device 63 is provided in the first supply path 62. The warming device 63 warms the ink that flows through the first supply path 62. The image forming apparatus 100A forms an image using the ink warmed by the warming device 63.

The first pump 64 is provided in the first supply path 62. The first pump 64 causes the ink in the first supply path 62 to flow in a flowing direction D21 (see FIG. 4) directed toward the recording head 30.

The sub ink tank 65 stores the ink supplied from the ink container 61. The ink stored in the sub ink tank 65 is supplied to the recording head 30.

The second supply path 66 is an ink flow path provided between the sub ink tank 65 and the recording head 30. The second supply path 66 is formed of a material having flexibility. For example, the second supply path 66 is a tube formed of a resin.

The second pump 67 is provided in the second supply path 66. The second pump 67 causes the ink in the second supply path 66 to flow in the flowing direction D21 (see FIG. 4).

It is noted that the image forming apparatus 100A does not need to include the sub ink tank 65. In other words, the ink may be directly supplied from the ink container 61 to the recording head 30.

[Configuration of Warming Device 63]

Next, a configuration of the warming device 63 will be described with reference to FIG. 5. Herein, FIG. 5 is a cross-sectional view showing the configuration of the warming device 63.

Figure 5:
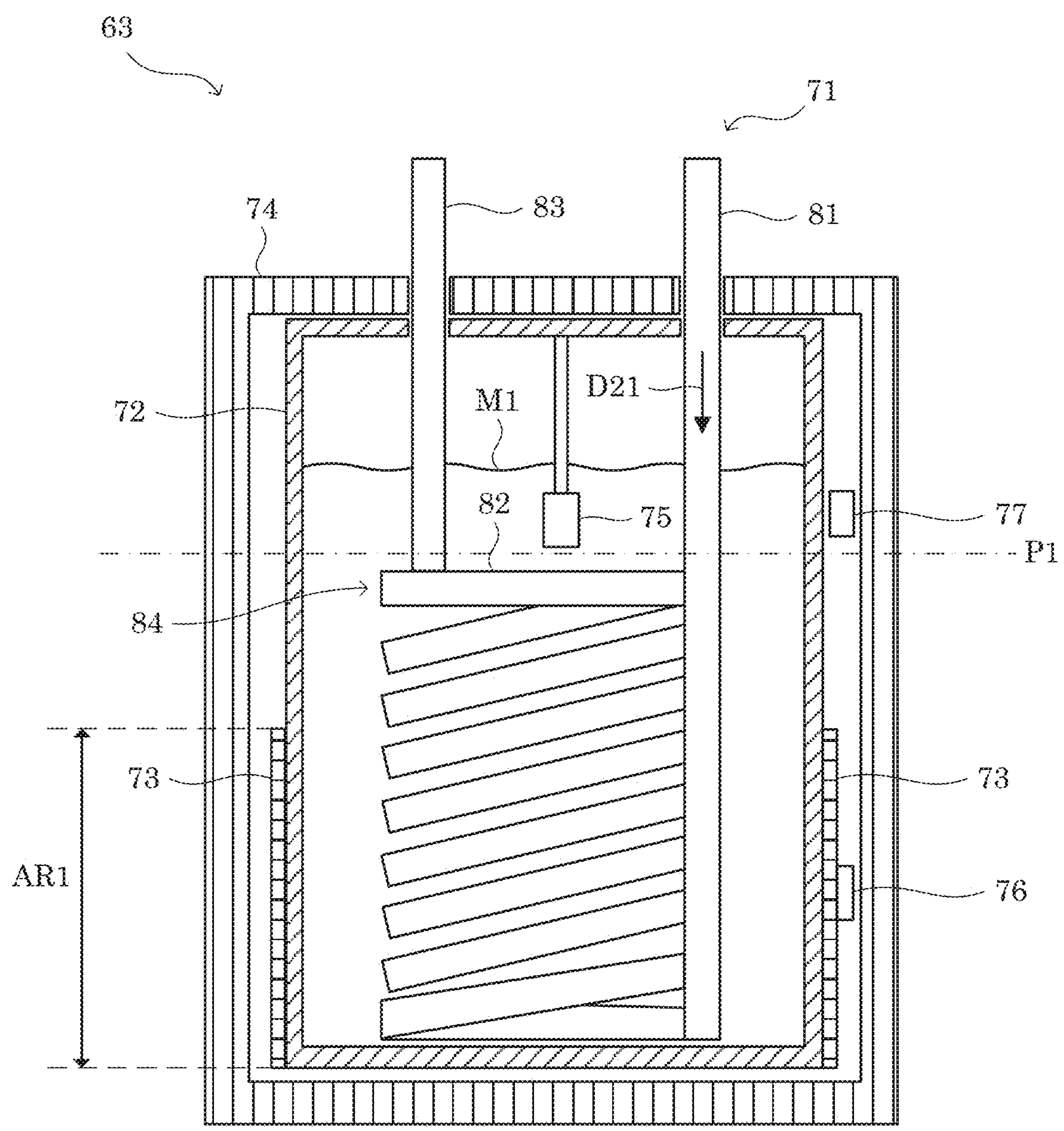
FIG. 5 is a diagram showing a configuration of a warming device of the image forming apparatus according to the first embodiment of the present disclosure.

As shown in FIG. 5, the warming device 63 includes a corrugated tube 71, a container 72, a heater 73, a heat insulation material 74, a first temperature sensor 75, and a second temperature sensor 76.

The corrugated tube 71 is a tube that is formed spirally. The corrugated tube 71 is arranged in an attitude in which a helical axis is provided along a vertical direction. For example, the corrugated tube 71 is formed by processing a straight pipe formed of metal into a spiral form. For example, the straight pipe is formed of stainless steel, and a cross-sectional shape thereof is an exact circle. It is noted that the cross-sectional shape of the straight pipe may alternatively be an oval or the like.

As shown in FIG. 5, the corrugated tube 71 includes a first piping portion 81, a spiral portion 82, and a second piping portion 83. The first piping portion 81 extends along the vertical direction. An upper end portion of the first piping portion 81 is connected to the ink container 61 (see FIG. 4) via the first supply path 62. The spiral portion 82 is formed spirally from a lower end portion of the first piping portion 81 toward an upward direction. The second piping portion 83 extends upwardly in the vertical direction from an upper end portion 84 of the spiral portion 82 (see FIG. 5). An upper end portion of the second piping portion 83 is connected to the first pump 64 (see FIG. 4) via the first supply path 62.

The container 72 stores the spiral portion 82 of the corrugated tube 71 and a liquid heating medium M1 (see FIG. 5) used for warming the spiral portion 82. The container 72 is an example of a storing portion according to the present disclosure.

For example, the container 72 includes a cylindrical portion extending along the vertical direction, a disk-shape bottom portion that blocks a lower end portion of the cylindrical portion, and a disk-shape top plate portion that blocks an upper end portion of the cylindrical portion. The first piping portion 81 and the second piping portion 83 of the corrugated tube 71 respectively pass through holes formed in the top plate portion and extend from inside the container 72 toward the outside of the container 72. It is noted that the container 72 does not need to include the top plate portion. In addition, the container 72 is not limited to the cylindrical shape and may alternatively be formed in a hollow prism.

The inside of the container 72 is filled with the heating medium M1 (see FIG. 5) in an amount with which the spiral portion 82 disappears in water. In other words, inside the container 72, a water surface of the heating medium M1 is positioned to be higher than the upper end portion 84 of the spiral portion 82 (see FIG. 5). The heating medium M1 is, for example, water. It is noted that the heating medium M1 is not limited to water and may be fluid such as oil.

The heater 73 heats the container 72. Specifically, the heater 73 is a so-called sheet heater. For example, the heater 73 includes a heating wire and a metal sheet such as aluminum that covers the heating wire. The heater 73 is provided to cover an outer surface of the container 72. It is noted that the heater 73 may alternatively be a silicon rubber heater or the like.

In the warming device 63, the heating medium M1 stored in the container 72 is heated by heating the container 72 by the heater 73. Thus, the ink flowing inside the spiral portion 82 arranged in the heating medium M1 is warmed. In the warming device 63, a sharp rise of the temperature of the ink can be suppressed as compared to a configuration in which heat of the heater 73 is transmitted to the ink via a metal plate that is in contact with both the heater 73 and piping through which the ink flows.

Incidentally, the closer the heating medium M1 in the container 72 is to the heater 73, the faster it is to heat the heating medium M1. In other words, in the warming device 63, the temperature of the heating medium M1 becomes non-uniform for a certain time after the start of the drive of the heater 73. When the temperature of the heating medium M1 is non-uniform, the temperature of the ink after the warming by the warming device 63 becomes unstable.

In contrast, in the warming device 63 according to the first embodiment of the present disclosure, a time required for uniformizing the temperature of the heating medium M1 can be shortened as will be described below.

Specifically, the heater 73 heats a portion of the container 72 that is lower than the upper end portion 84 of the spiral portion 82 and does not heat a portion of the container 72 that is higher than the upper end portion 84.

In other words, in the warming device 63, out of the heating medium M1 stored in the container 72, an upper portion including the water surface is not heated by the heater 73. Thus, a temperature difference is caused between the upper portion and bottom-side portion of the heating medium M1 stored in the container 72, and thus a convection flow is generated in the heating medium M1. Therefore, the time required for uniformizing the temperature of the heating medium M1 can be shortened. In addition, the time required for uniformizing the temperature of the heating medium M1 can be shortened without providing a configuration for stirring the heating medium M1.

For example, the heater 73 heats at least a bottom portion of the container 72.

For example, out of the cylindrical portion of the container 72, the heater 73 heats an area AR1 (see FIG. 5) ranging from the lower end portion to a portion lower than the upper end portion 84 of the spiral portion 82. For example, the sheet heater 73 is wound around the area AR1.

It is noted that the heater 73 may heat a part of the cylindrical portion and a bottom surface of the bottom portion of the container 72. Alternatively, the heater 73 may heat only the bottom surface of the bottom portion of the container 72. Alternatively, the heater 73 may heat only an upper partial portion of the area AR1. In other words, the heater 73 does not need to heat the bottom portion of the container 72.

The heat insulation material 74 is provided to cover an outer circumferential surface of the container 72. The heater 73 is provided between the container 72 and the heat insulation material 74. For example, the heat insulation material 74 is provided so as to cover an entire outer surface of the container 72.

The first temperature sensor 75 is a contact-type temperature sensor which is provided in the container 72 and is used for detecting the temperature of the heating medium M1. For example, as shown in FIG. 5, the first temperature sensor 75 is provided at a position higher than the spiral portion 82 of the corrugated tube 71. In this case, the heating medium M1 is filled inside the container 72 in an amount with which the first temperature sensor 75 disappears in water. For example, the first temperature sensor 75 is arranged on an inner side of the spiral portion 82. The first temperature sensor 75 outputs a first detection signal including a signal value corresponding to the temperature of the heating medium M1 in contact therewith. The first detection signal output from the first temperature sensor 75 is input to the control portion 7. It is noted that the first temperature sensor 75 may alternatively be arranged on an outer side of the spiral portion 82. Alternatively, the first temperature sensor 75 may be arranged below the upper end portion 84 of the spiral portion 82.

The second temperature sensor 76 is provided outside the container 72 and is used for detecting a temperature of the container 72. For example, as shown in FIG. 5, the second temperature sensor 76 is provided between the heater 73 and the heat insulation material 74. The second temperature sensor 76 outputs a second detection signal including a signal value corresponding to the temperature of the container 72. The second detection signal output from the second temperature sensor 76 is input to the control portion 7. It is noted that the second temperature sensor 76 may alternatively be provided in contact with the outer surface of the container 72.

[Configuration of Control Portion 7]

Next, a configuration of the control portion 7 will be described in more detail with reference to FIG. 3.

As shown in FIG. 3, the control portion 7 includes a drive control portion 91, a stop processing portion 92, and an acquisition processing portion 93. A device including the control portion 7 and the warming device 63 is an example of the warming device according to the present disclosure.

Specifically, a first operation control program for causing the CPU 51 to function as the respective functional portions described above is stored in advance in the ROM 52 of the control portion 7. Then, the CPU 51 executes the first operation control program stored in the ROM 52 to function as the respective functional portions described above.

It is noted that the first operation control program may be recorded onto a computer-readable recording medium such as a CD, a DVD, and a flash memory so as to be read from the recording medium and stored in a storage device such as the storage portion 6. Alternatively, a part or all of the respective functional portions described above may be configured by an electronic circuit such as an integrated circuit (ASIC). Alternatively, the first operation control program may be a program for causing a plurality of processors to function as the respective functional portions included in the control portion 7.

The drive control portion 91 controls the drive of the heater 73 based on a first detection temperature detected by the first temperature sensor 75.

Specifically, the drive control portion 91 controls power to be supplied to the heater 73 such that the first detection temperature detected by the first temperature sensor 75 becomes a predetermined target temperature. The target temperature is set based on the temperature of the ink suited for printing. For example, the drive control portion 91 controls the drive of the heater 73 by PID control. For example, in the image forming apparatus 100A, a switching device (not shown) that is capable of making a switch between conduction and cutoff of a power feeding path between a power supply (not shown) and the heater 73 is provided on the power feeding path. The drive control portion 91 inputs a PWM signal of a duty ratio corresponding to a difference between the first detection temperature and the target temperature to the switching device, to thus control on/off of the switching device. Thus, a power feeding amount to the heater 73 is adjusted in accordance with the difference between the first detection temperature and the target temperature.

For example, the drive control portion 91 executes drive control of the heater 73 when image forming processing for forming an image based on image data using the image forming portion 3 is executed. For example, in the image forming apparatus 100A, when the first detection temperature reaches the target temperature, supply of the ink by the ink supply portion 8 is started, and execution of the image forming processing is started.

Incidentally, in the warming device 63, the first temperature sensor 75 is arranged in the heating medium M1 in which the convection flow is generated. In other words, the first temperature sensor 75 receives the flow of the heating medium M1. Therefore, in the warming device 63, an anomaly such as a failure or a contact failure may occur in the first temperature sensor 75. When the anomaly occurs in the first temperature sensor 75, there is a fear that the drive control of the heater 73 will not function and the temperature of the heating medium M1 will rise excessively.

In contrast, in the warming device 63 according to the first embodiment of the present disclosure, an excessive rise of the temperature of the heating medium M1 can be avoided as will be described below.

The stop processing portion 92 stops the drive of the heater 73 when the temperature of the container 72 exceeds a predetermined upper limit temperature. The stop processing portion 92 is an example of a stop portion according to the present disclosure.

Specifically, the stop processing portion 92 stops the drive of the heater 73 when a second detection temperature detected by the second temperature sensor 76 exceeds the upper limit temperature. The upper limit temperature is a temperature higher than the target temperature.

In addition, the stop processing portion 92 limits the execution of the image forming processing.

Herein, the warming device 63 includes a thermostat 77 shown in FIG. 5.

When the temperature of the container 72 exceeds a predetermined cutoff temperature, the thermostat 77 cuts off the power feeding path of the heater 73 to stop the drive of the heater 73. For example, the thermostat 77 is provided on the outer surface of the container 72. For example, as shown in FIG. 5, the thermostat 77 is arranged at the same position as the first temperature sensor 75 in the vertical direction. The cutoff temperature is a temperature higher than the target temperature. For example, the cutoff temperature is a temperature higher than the upper limit temperature. The thermostat 77 is another example of the stop portion according to the present disclosure. In addition, the cutoff temperature is another example of the upper limit temperature according to the present disclosure. It is noted that a thermal fuse may be used in place of the thermostat 77.

The acquisition processing portion 93 acquires a storage amount of the heating medium M1 in the container 72 based on a rising velocity of the second detection temperature from a start of the drive of the heater 73.

For example, in the image forming apparatus 100A, table data in which the rising velocity of the second detection temperature and the storage amount of the heating medium M1 are associated with each other is stored in advance in the storage portion 6. In the table data, a correspondence relationship between the rising velocity of the second detection temperature and the storage amount of the heating medium M1 is determined such that the storage amount of the heating medium M1 decreases as the rising velocity of the second detection temperature increases. It is noted that the table data can be created for each of a plurality of storage amounts of the heating medium M1 based on a result of an experiment of measuring the rising velocity of the second detection temperature that corresponds to the storage amount.

For example, the acquisition processing portion 93 acquires the rising velocity of the second detection temperature based on a rising amount of the second detection temperature obtained before a predetermined specific time elapses since the start of the drive of the heater 73. Then, the acquisition processing portion 93 acquires the storage amount of the heating medium M1 associated with the acquired rising velocity of the second detection temperature in the table data, as the current storage amount of the heating medium M1 in the container 72.

For example, when the storage amount of the heating medium M1 in the container 72 is acquired by the acquisition processing portion 93, the control portion 7 notifies the storage amount. For example, the control portion 7 causes the operation display portion 5 to display the storage amount of the heating medium M1 in the container 72 that has been acquired by the acquisition processing portion 93.

It is noted that when the storage amount of the heating medium M1 in the container 72 that has been acquired by the acquisition processing portion 93 falls below a predetermined lower limit amount, the control portion 7 may stop the drive of the heater 73 and notify that the heating medium is in a heating medium shortage state. The heating medium shortage state is a state where the storage amount of the heating medium M1 in the container 72 falls below the lower limit amount. The lower limit amount is the storage amount of the heating medium M1 in the container 72 in a case where the water surface of the heating medium M1 is at a lower limit position P1 shown in FIG. 5. The lower limit position P1 is a position lower than the first temperature sensor 75 and higher than the upper end portion 84 of the spiral portion 82. It is noted that in FIG. 5, the lower limit position P1 is indicated by a dash-dot line.

Alternatively, the control portion 7 may notify the storage amount only when the storage amount of the heating medium M1 in the container 72 that has been acquired by the acquisition processing portion 93 falls below a predetermined amount larger than the lower limit amount.

[First Operation Control Processing]

Figure 6:
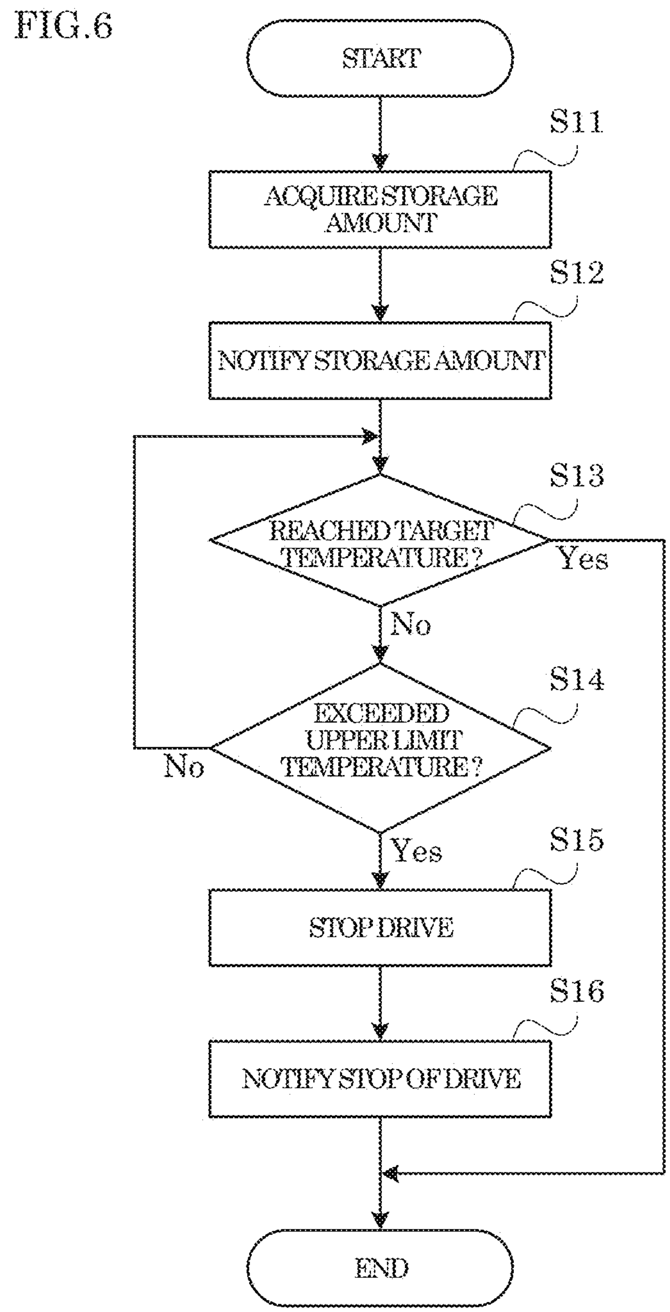
FIG. 6 is a flowchart showing an example of first operation control processing executed in the image forming apparatus according to the first embodiment of the present disclosure.

Hereinafter, exemplary procedures of first operation control processing executed by the control portion 7 in the image forming apparatus 100A will be described with reference to FIG. 6. Herein, Step S11, Step S12, . . . represent numbers of processing procedures (steps) executed by the control portion 7. It is noted that the first operation control processing is executed when the drive control of the heater 73 is started by the drive control portion 91.

<Step S11>

First, in Step S11, the control portion 7 acquires the storage amount of the heating medium M1 in the container 72 based on the rising velocity of the second detection temperature from the start of the drive of the heater 73. Herein, the processing of Step S11 is executed by the acquisition processing portion 93 of the control portion 7.

Specifically, the control portion 7 acquires the rising velocity of the second detection temperature based on the rising amount of the second detection temperature obtained before the specific time elapses since the start of the drive of the heater 73. Then, the control portion 7 acquires the storage amount of the heating medium M1 associated with the acquired rising velocity of the second detection temperature in the table data as the current storage amount of the heating medium M1 in the container 72.

<Step S12>

In Step S12, the control portion 7 notifies the storage amount of the heating medium M1 in the container 72 that has been acquired by the processing of Step S11.

Specifically, the control portion 7 causes the operation display portion 5 to display the storage amount of the heating medium M1 in the container 72 that has been acquired by the processing of Step S11. Thus, a user of the image forming apparatus 100A can determine whether or not the heating medium M1 needs to be replenished.

<Step S13>

In Step S13, the control portion 7 determines whether or not the first detection temperature detected by the first temperature sensor 75 has reached the target temperature.

Herein, when determining that the first detection temperature has reached the target temperature (Yes in S13), the control portion 7 ends the first operation control processing. On the other hand, when the first detection temperature has not reached the target temperature (No in S13), the control portion 7 shifts the processing to Step S14.

<Step S14>

In Step S14, the control portion 7 determines whether or not the second detection temperature detected by the second temperature sensor 76 has exceeded the upper limit temperature.

Herein, when determining that the second detection temperature has exceeded the upper limit temperature (Yes in S14), the control portion 7 shifts the processing to Step S15. On the other hand, when the second detection temperature has not exceeded the upper limit temperature (No in S14), the control portion 7 shifts the processing to Step S13.

<Step S15>

In Step S15, the control portion 7 stops the drive of the heater 73. In addition, the control portion 7 restricts the execution of the image forming processing. Herein, the processing of Step S15 is executed by the stop processing portion 92 of the control portion 7.

<Step S16>

In Step S16, the control portion 7 notifies that, due to the anomaly or the heating medium shortage state, the drive of the heater 73 has been stopped. Thus, the user of the image forming apparatus 100A can take measures such as eliminating the anomaly or replenishing the heating medium M1.

In this manner, in the image forming apparatus 100A, the portion of the container 72 that is lower than the upper end portion 84 of the spiral portion 82 is heated, and the portion that is higher than the upper end portion 84 is not heated. Thus, a temperature difference is caused between the upper portion and bottom-side portion of the heating medium M1 stored in the container 72, and thus a convection flow is generated in the heating medium M1. Therefore, the time required for uniformizing the temperature of the heating medium M1 can be shortened.

Incidentally, in the image forming apparatus 100A, the storage amount of the heating medium M1 in the container 72 may decrease due to evaporation or leakage. When the storage amount of the heating medium M1 in the container 72 decreases, the function of warming the ink by the warming device 63 is lowered.

In contrast, in an image forming apparatus 100B according to a second embodiment of the present disclosure, it is possible to determine lowering of the warming function as will be described below.

Second Embodiment

Next, a configuration of the image forming apparatus 100B according to the second embodiment of the present disclosure will be described with reference to FIG. 7 and FIG. 8.

In the image forming apparatus 100B, the configurations of the control portion 7 and the ink supply portion 8 differ from those of the image forming apparatus 100A. It is noted that other configurations are common to the image forming apparatus 100A and the image forming apparatus 100B. Hereinafter, descriptions will be given on only the configurations of the image forming apparatus 100B that are different from those of the image forming apparatus 100A.

Figure 8:
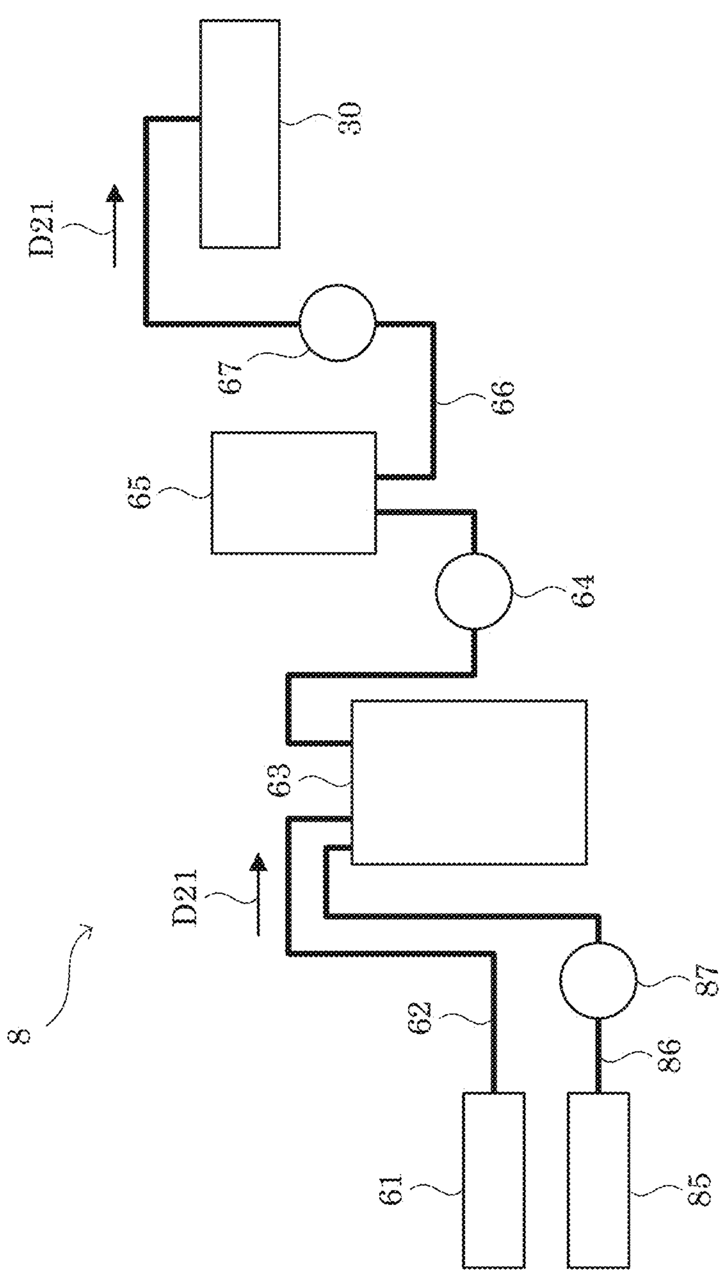
FIG. 8 is a diagram showing a configuration of an ink supply portion of the image forming apparatus according to the second embodiment of the present disclosure.

As shown in FIG. 8, the ink supply portion 8 of the image forming apparatus 100B further includes a heating medium storing portion 85, a heating medium supply path 86, and a third pump 87.

The heating medium storing portion 85 stores the heating medium M1.

The heating medium supply path 86 is a path of the heating medium M1 that is provided between the heating medium storing portion 85 and the container 72 of the warming device 63. The heating medium supply path 86 is formed of a material having flexibility. For example, the heating medium supply path 86 is a tube formed of a resin.

The third pump 87 is provided in the heating medium supply path 86. The third pump 87 causes the heating medium M1 in the heating medium supply path 86 to flow toward the warming device 63 side.

Figure 7:
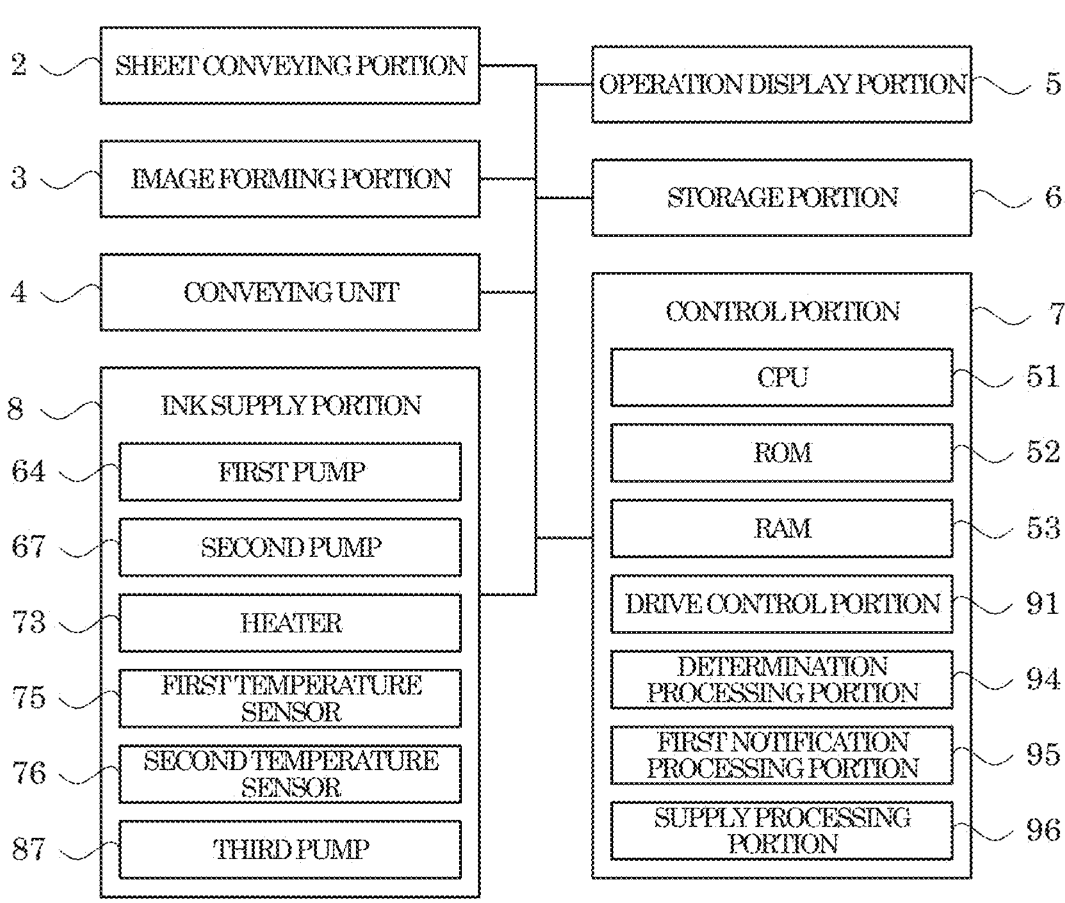
FIG. 7 is a block diagram showing a system configuration of an image forming apparatus according to a second embodiment of the present disclosure.

As shown in FIG. 7, the control portion 7 includes the drive control portion 91, a determination processing portion 94, a first notification processing portion 95, and a supply processing portion 96. A device including the control portion 7 and the warming device 63 is another example of the warming device according to the present disclosure.

Specifically, a second operation control program for causing the CPU 51 of the control portion 7 to function as the respective functional portions described above is stored in advance in the ROM 52 of the control portion 7. Then, the CPU 51 of the control portion 7 executes the second operation control program stored in the ROM 52 to function as the respective functional portions described above.

The function of the drive control portion 91 is the same as that of the drive control portion 91 included in the image forming apparatus 100A.

The determination processing portion 94 determines whether or not the heating medium is in the heating medium shortage state where the storage amount of the heating medium M1 in the container 72 falls below the lower limit amount based on the first detection temperature obtained after the start of the drive of the heater 73.

For example, the determination processing portion 94 determines that the heating medium is in the heating medium shortage state when a rising amount of the first detection temperature obtained before a predetermined reference time elapses since the start of the drive of the heater 73 is equal to or smaller than a predetermined threshold value.

When it is determined by the determination processing portion 94 that the heating medium is in the heating medium shortage state, the first notification processing portion 95 notifies to that effect.

For example, the first notification processing portion 95 causes the operation display portion 5 to display a message notifying that the heating medium is in the heating medium shortage state.

In addition, the first notification processing portion 95 restricts the execution of the image forming processing.

It is noted that in the image forming apparatus 100B, even after it is determined that the heating medium is in the heating medium shortage state, the drive control of the heater 73 by the drive control portion 91 is continued for determining elimination of the heating medium shortage state by supplying the heating medium M1.

When it is determined by the determination processing portion 94 that the heating medium is in the heating medium shortage state, the supply processing portion 96 supplies the heating medium M1 to the container 72.

Specifically, the supply processing portion 96 drives the third pump 87 to supply the heating medium M1 stored in the heating medium storing portion 85 to the container 72.

For example, the supply processing portion 96 supplies the heating medium M1 to the container 72 until it is determined that the heating medium shortage state has been eliminated based on the first detection temperature.

For example, the determination processing portion 94 determines that the heating medium shortage state has been eliminated when the rising amount of the first detection temperature from the start of the supply of the heating medium M1 to the container 72 exceeds the threshold value. When it is determined by the determination processing portion 94 that the heating medium shortage state has been eliminated, the supply processing portion 96 stops the supply of the heating medium M1 to the container 72.

It is noted that when it is determined that the heating medium is in the heating medium shortage state, the control portion 7 may lower the target temperature by a predetermined specific amount so that the duty ratio of the PWM signal becomes smaller than 100% until it is determined that the heating medium shortage state has been eliminated. For example, the specific amount only needs to be set based on a temperature inside the image forming apparatus 100B. Further, the control portion 7 may acquire a time required for the temperature of the heating medium M1 to reach the target temperature based on the first detection temperature obtained when it is determined that the heating medium shortage state has been eliminated, and notify the acquired time. Thus, the user can recognize a waiting time required for the first detection temperature to reach the target temperature, that is, a waiting time required until the execution of the image forming processing is started.

Further, the supply processing portion 96 may supply a predetermined amount of the heating medium M1 to the container 72.

[Second Operation Control Processing]

Hereinafter, with reference to FIG. 9, an example of a determination method according to the present disclosure will be described together with exemplary procedures of second operation control processing executed by the control portion 7 in the image forming apparatus 100B. It is noted that the second operation control processing is executed when the drive control of the heater 73 is started by the drive control portion 91.

<Step S21>

First, in Step S21, the control portion 7 executes first determination processing for determining whether or not the heating medium is in the heating medium shortage state based on the first detection temperature obtained after the start of the drive of the heater 73. Herein, the processing of Step S21 is an example of a determination step according to the present disclosure and is executed by the determination processing portion 94 of the control portion 7.

Specifically, the control portion 7 determines that the heating medium is in the heating medium shortage state when the rising amount of the first detection temperature obtained before the reference time elapses since the start of the drive of the heater 73 is equal to or smaller than the threshold value.

<Step S22>

In Step S22, the control portion 7 switches subsequent processing according to a result of the processing of Step S21. Specifically, when it is determined that the heating medium is in the heating medium shortage state by the processing of Step S21 (Yes in S22), the control portion 7 shifts the processing to Step S23. On the other hand, when it is not determined that the heating medium is in the heating medium shortage state by the processing of Step S21 (No in S22), the control portion 7 ends the second operation control processing.

<Step S23>

In Step S23, the control portion 7 executes first notification processing for notifying that the heating medium is in the heating medium shortage state. In addition, the control portion 7 restricts the execution of the image forming processing. Herein, the processing of Step S23 is executed by the first notification processing portion 95 of the control portion 7.

For example, the control portion 7 causes the operation display portion 5 to display a message notifying that the heating medium is in the heating medium shortage state. Thus, the user of the image forming apparatus 100B can recognize that the execution of the image forming processing is restricted due to the heating medium shortage state.

It is noted that the control portion 7 continues the drive control of the heater 73 by the drive control portion 91 even after it is determined that the heating medium is in the heating medium shortage state.

<Step S24>

In Step S24, the control portion 7 executes supply processing for supplying the heating medium M1 to the container 72. Herein, the processing of Step S24 is executed by the supply processing portion 96 of the control portion 7.

Specifically, the control portion 7 supplies the heating medium M1 to the container 72 until it is determined that the heating medium shortage state has been eliminated based on the first detection temperature. Thus, the heating medium shortage state can be eliminated for sure as compared to a configuration in which a predetermined amount of the heating medium M1 is supplied to the container 72.

It is noted that the control portion 7 only needs to cancel the restriction on the execution of the image forming processing when the heating medium shortage state is eliminated.

In this manner, in the image forming apparatus 100B, the first temperature sensor 75 is provided at a position higher than the spiral portion 82 of the corrugated tube 71 in the container 72 as shown in FIG. 5. Thus, the first temperature sensor 75 can be used to determine whether or not the storage amount of the heating medium M1 in the container 72 has decreased due to evaporation or leakage.

Third Embodiment

Next, a configuration of an image forming apparatus 100C according to a third embodiment of the present disclosure will be described with reference to FIG. 10.

In the image forming apparatus 100C, the configurations of the control portion 7 and the warming device 63 differ from those of the image forming apparatus 100B. It is noted that other configurations are common to the image forming apparatus 100B and the image forming apparatus 100C. Hereinafter, descriptions will be given on only the configurations of the image forming apparatus 100C that are different from those of the image forming apparatus 100B.

Figure 10:
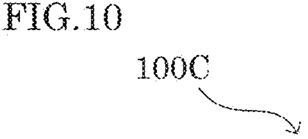
FIG. 10 is a block diagram showing a system configuration of an image forming apparatus according to a third embodiment of the present disclosure.
Figure 10:
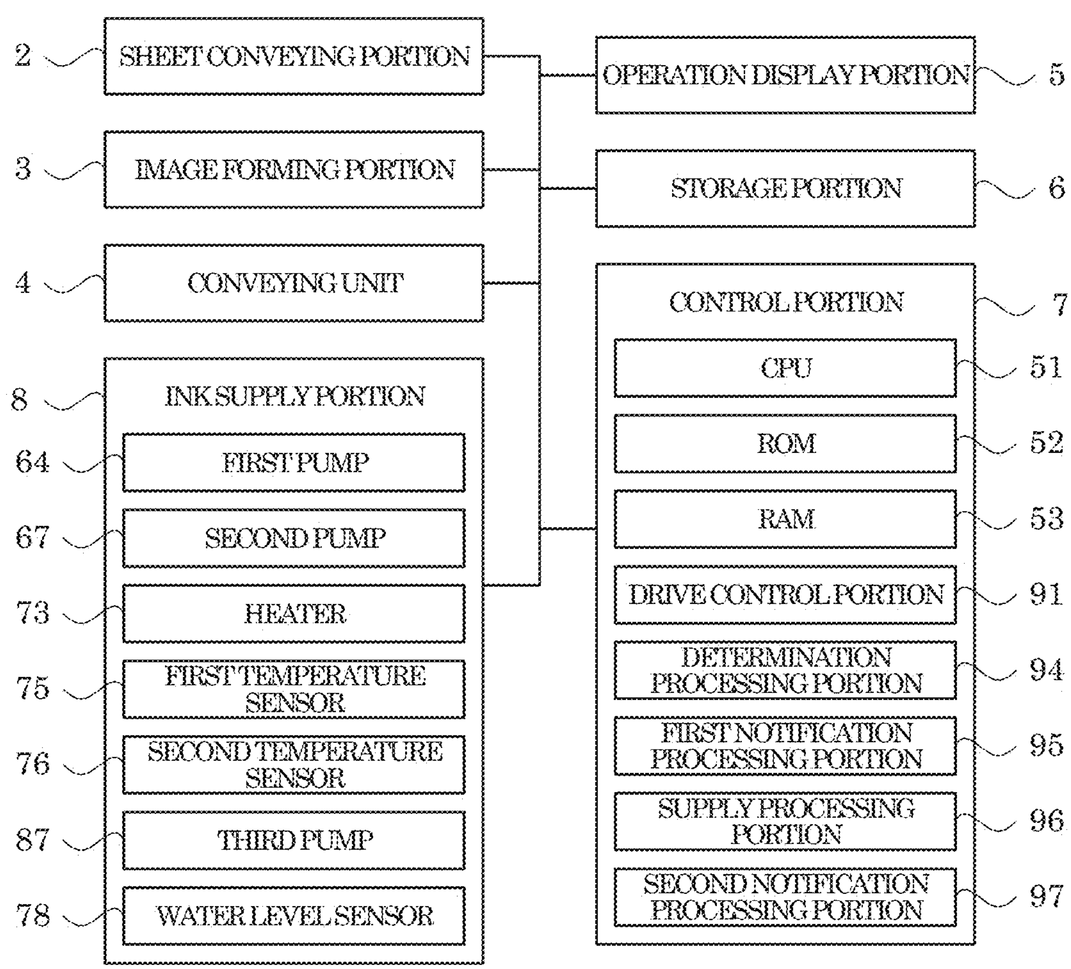

The warming device 63 of the image forming apparatus 100C further includes a water level sensor 78 shown in FIG. 10.

The water level sensor 78 detects a water level of the heating medium M1 in the container 72. For example, the water level sensor 78 is a so-called float sensor. The water level sensor 78 includes a floating portion that floats on a water surface of the heating medium M1 stored in the container 72 and detects a water level of the heating medium M1 using the floating portion. When the water level of the heating medium M1 stored in the container 72 falls below the lower limit position P1 (see FIG. 5), the water level sensor 78 outputs a third detection signal notifying to that effect.

As shown in FIG. 10, the control portion 7 includes the drive control portion 91, the determination processing portion 94, the first notification processing portion 95, the supply processing portion 96, and a second notification processing portion 97. A device including the control portion 7 and the warming device 63 is another example of the warming device according to the present disclosure.

Specifically, a third operation control program for causing the CPU 51 of the control portion 7 to function as the respective functional portions described above is stored in advance in the ROM 52 of the control portion 7. Then, the CPU 51 of the control portion 7 executes the third operation control program stored in the ROM 52 to function as the respective functional portions described above.

The functions of the drive control portion 91 and the first notification processing portion 95 are the same as those of the drive control portion 91 and the first notification processing portion 95 included in the image forming apparatus 100B.

The determination processing portion 94 determines whether or not the heating medium is in the heating medium shortage state where the storage amount of the heating medium M1 in the container 72 falls below the lower limit amount based on the detection result obtained by the water level sensor 78 and the first detection temperature obtained after the start of the drive of the heater 73.

For example, the determination processing portion 94 determines that the heating medium is in the heating medium shortage state when the rising amount of the first detection temperature obtained before the reference time elapses since the start of the drive of the heater 73 is equal to or smaller than the threshold value.

Further, the determination processing portion 94 determines that the heating medium is in the heating medium shortage state when the third detection signal is output from the water level sensor 78.

In addition, the determination processing portion 94 determines that the heating medium is not in the heating medium shortage state when it is not determined that the heating medium is in the heating medium shortage state based on the detection result obtained by the water level sensor 78 and also when it is not determined that the heating medium is in the heating medium shortage state based on the first detection temperature obtained after the start of the drive of the heater 73.

Herein, when the determination result that is based on the detection result obtained by the water level sensor 78 and the determination result that is based on the first detection temperature obtained after the start of the drive of the heater 73 differ, the determination processing portion 94 determines that a failure has occurred in the water level sensor 78 or the first temperature sensor 75. Specifically, the determination processing portion 94 determines that the failure has occurred in either the water level sensor 78 or the first temperature sensor 75 that has obtained the detection result based on which it has been determined that the heating medium is not in the heating medium shortage state.

It is noted that the determination processing portion 94 may determine whether or not the heating medium is in the heating medium shortage state based only on the detection result obtained by the water level sensor 78.

The supply processing portion 96 supplies the heating medium M1 to the container 72 when it is determined by the determination processing portion 94 that the heating medium is in the heating medium shortage state.

Specifically, the supply processing portion 96 drives the third pump 87 to supply the heating medium M1 stored in the heating medium storing portion 85 to the container 72.

For example, the supply processing portion 96 supplies the heating medium M1 to the container 72 until it is determined that the heating medium shortage state has been eliminated based on the detection result obtained by the water level sensor 78.

For example, the determination processing portion 94 determines that the heating medium shortage state has been eliminated when the output of the third detection signal from the water level sensor 78 stops. When it is determined by the determination processing portion 94 that the heating medium shortage state has been eliminated, the supply processing portion 96 stops the supply of the heating medium M1 to the container 72.

When it is determined by the determination processing portion 94 that a failure has occurred in the water level sensor 78 or the first temperature sensor 75, the second notification processing portion 97 notifies to that effect.

For example, the second notification processing portion 97 causes the operation display portion 5 to display a message that notifies that the failure has occurred in the water level sensor 78 or the first temperature sensor 75.

[Third Operation Control Processing]

Figure 11:
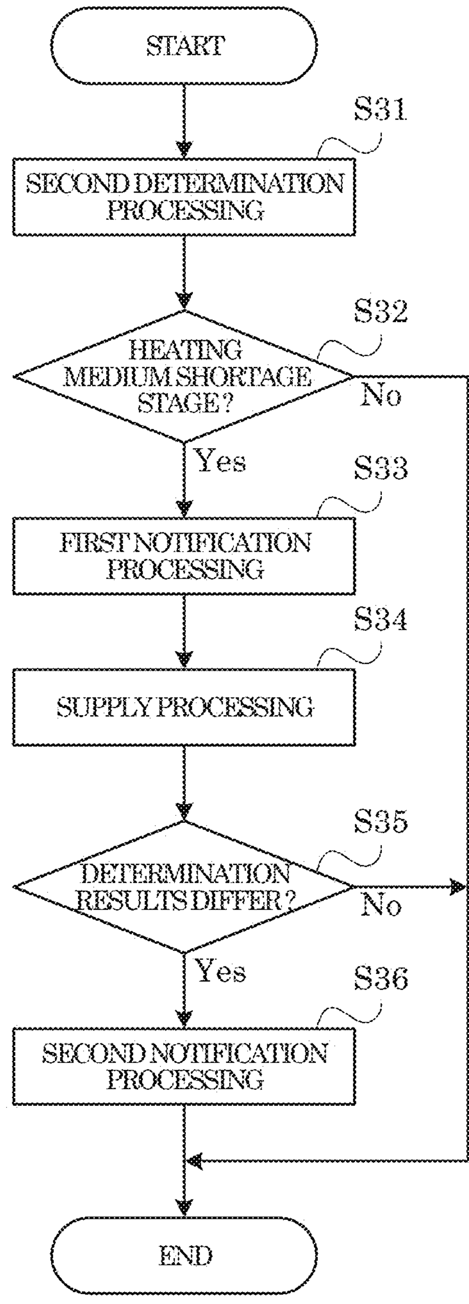
FIG. 11 is a flowchart showing an example of third operation control processing executed in the image forming apparatus according to the third embodiment of the present disclosure.

Hereinafter, with reference to FIG. 11, another example of the determination method according to the present disclosure will be described together with exemplary procedures of third operation control processing executed by the control portion 7 in the image forming apparatus 100C. It is noted that the third operation control processing is executed when the drive control of the heater 73 is started by the drive control portion 91.

<Step S31>

First, in Step S31, the control portion 7 executes second determination processing for determining whether or not the heating medium is in the heating medium shortage state where the storage amount of the heating medium M1 in the container 72 falls below the lower limit amount based on the detection result obtained by the water level sensor 78 and the first detection temperature obtained after the start of the drive of the heater 73. Herein, the processing of Step S31 is another example of the determination step according to the present disclosure and is executed by the determination processing portion 94 of the control portion 7.

Specifically, the control portion 7 determines that the heating medium is in the heating medium shortage state when the rising amount of the first detection temperature obtained before the reference time elapses since the start of the drive of the heater 73 is equal to or smaller than the threshold value. In addition, the control portion 7 determines that the heating medium is in the heating medium shortage state when the third detection signal is output from the water level sensor 78. Moreover, the control portion 7 determines that the heating medium is not in the heating medium shortage state when it is not determined that the heating medium is in the heating medium shortage state based on the detection result obtained by the water level sensor 78 and also when it is not determined that the heating medium is in the heating medium shortage state based on the first detection temperature obtained after the start of the drive of the heater 73.

<Step S32>

In Step S32, the control portion 7 switches subsequent processing according to a result of the processing of Step S31. Specifically, when it is determined that the heating medium is in the heating medium shortage state by the processing of Step S31 (Yes in S32), the control portion 7 shifts the processing to Step S33. On the other hand, when it is not determined that the heating medium is in the heating medium shortage state by the processing of Step S31 (No in S32), the control portion 7 ends the third operation control processing.

<Step S33>

In Step S33, the control portion 7 executes first notification processing for notifying that the heating medium is in the heating medium shortage state. In addition, the control portion 7 restricts the execution of the image forming processing. Herein, the processing of Step S33 is executed by the first notification processing portion 95 of the control portion 7.

<Step S34>

In Step S34, the control portion 7 executes the supply processing for supplying the heating medium M1 to the container 72. Herein, the processing of Step S34 is executed by the supply processing portion 96 of the control portion 7.

Specifically, the control portion 7 supplies the heating medium M1 to the container 72 until it is determined that the heating medium shortage state has been eliminated based on the detection result obtained by the water level sensor 78.

It is noted that the control portion 7 only needs to cancel the restriction on the execution of the image forming processing when the heating medium shortage state is eliminated.

<Step S35>

In Step S35, the control portion 7 switches subsequent processing according to the result of the processing of Step S31. Specifically, when the determination result that is based on the detection result obtained by the water level sensor 78 and the determination result that is based on the first detection temperature obtained after the start of the drive of the heater 73 differ in the processing of Step S31 (Yes in S35), the control portion 7 shifts the processing to Step S36. On the other hand, when the determination result that is based on the detection result obtained by the water level sensor 78 and the determination result that is based on the first detection temperature obtained after the start of the drive of the heater 73 are the same in the processing of Step S31 (No in S35), the control portion 7 ends the third operation control processing.

<Step S36>

In Step S36, the control portion 7 notifies that a failure has occurred in the water level sensor 78 or the first temperature sensor 75. Herein, the processing of Step S36 is executed by the second notification processing portion 97 of the control portion 7.

Specifically, the control portion 7 causes the operation display portion 5 to display a message notifying that a failure has occurred in the water level sensor 78 when it is not determined that the heating medium is in the heating medium shortage state based on the detection result obtained by the water level sensor 78 in the processing of Step S31. In addition, the control portion 7 causes the operation display portion 5 to display a message notifying that a failure has occurred in the first temperature sensor 75 when it is not determined that the heating medium is in the heating medium shortage state based on the first detection temperature obtained after the start of the drive of the heater 73 in the processing of Step S31. Thus, the user of the image forming apparatus 100C can take measures such as replacing the sensor in which the failure has occurred.

In this manner, in the image forming apparatus 100C, the water level sensor 78 which detects the water level of the heating medium M1 in the container 72 is provided. Thus, it is possible to determine whether or not the storage amount of the heating medium M1 in the container 72 has decreased due to evaporation or leakage.

NOTES OF DISCLOSURE

Hereinafter, a general outline of the disclosure extracted from the embodiments described above will be noted. It is noted that the respective configurations and processing functions described in the notes below can be sorted and arbitrarily combined as appropriate.

Note 1

A warming device, including: a corrugated tube including a spiral portion that is formed spirally; a storing portion which stores the spiral portion and a liquid heating medium used for warming the spiral portion; a heater which heats the storing portion; a water level sensor which detects a water level of the heating medium in the storing portion; and a determination processing portion which determines, based on a detection result obtained by the water level sensor, whether or not the heating medium is in a heating medium shortage state where a storage amount of the heating medium in the storing portion falls below a predetermined lower limit amount.

Note 2

The warming device according to note 1, including a first notification processing portion which, when it is determined by the determination processing portion that the heating medium is in the heating medium shortage state, notifies to that effect.

Note 3

The warming device according to note 1 or 2, including a supply processing portion which supplies the heating medium to the storing portion when it is determined by the determination processing portion that the heating medium is in the heating medium shortage state.

Note 4

The warming device according to note 3, in which the supply processing portion supplies the heating medium to the storing portion until it is determined that the heating medium shortage state has been eliminated.

Note 5

The warming device according to any one of notes 1 to 4, including: a contact-type temperature sensor which is provided at a position higher than the spiral portion in the storing portion and is used for detecting a temperature of the heating medium; and a drive control portion which controls drive of the heater based on a detection temperature detected by the temperature sensor, in which the determination processing portion determines whether the heating medium is in the heating medium shortage state based on the detection result obtained by the water level sensor and the detection temperature obtained after a start of the drive of the heater.

Note 6

The warming device according to note 5, in which the determination processing portion determines that a failure has occurred in one of the water level sensor and the temperature sensor when a determination result that is based on the detection result obtained by the water level sensor and a determination result that is based on the detection temperature obtained after the start of the drive of the heater differ, and the warming device includes a second notification processing portion which, when it is determined by the determination processing portion that a failure has occurred in one of the water level sensor and the temperature sensor, notifies to that effect.

Note 7

An image forming apparatus, including the warming device according to any one of notes 1 to 6, in which the image forming apparatus forms an image using ink warmed by the warming device.

Note 8

A determination method executed in a warming device including a corrugated tube including a spiral portion that is formed spirally, a storing portion which stores the spiral portion and a liquid heating medium used for warming the spiral portion, a heater which heats the storing portion, and a water level sensor which detects a water level of the heating medium in the storing portion, the determination method including a determination step of determining, based on a detection result obtained by the water level sensor, whether or not the heating medium is in a heating medium shortage state where a storage amount of the heating medium in the storing portion falls below a predetermined lower limit amount.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A warming device, comprising:
- a corrugated tube including a spiral portion that is formed spirally;
- a storing portion which stores the spiral portion and a liquid heating medium used for warming the spiral portion;
- a heater which heats the storing portion;
- a water level sensor which detects a water level of the heating medium in the storing portion; and
- a determination processing portion which determines, based on a detection result obtained by the water level sensor, whether or not the heating medium is in a heating medium shortage state where a storage amount of the heating medium in the storing portion falls below a predetermined lower limit amount.

2. The warming device according to claim 1, comprising
- a first notification processing portion which, when it is determined by the determination processing portion that the heating medium is in the heating medium shortage state, notifies to that effect.

3. The warming device according to claim 1, comprising
- a supply processing portion which supplies the heating medium to the storing portion when it is determined by the determination processing portion that the heating medium is in the heating medium shortage state.

4. The warming device according to claim 3, wherein
- the supply processing portion supplies the heating medium to the storing portion until it is determined that the heating medium shortage state has been eliminated.

5. The warming device according to claim 1, comprising:
- a contact-type temperature sensor which is provided at a position higher than the spiral portion in the storing portion and is used for detecting a temperature of the heating medium; and
- a drive control portion which controls drive of the heater based on a detection temperature detected by the temperature sensor,
- wherein the determination processing portion determines whether the heating medium is in the heating medium shortage state based on the detection result obtained by the water level sensor and the detection temperature obtained after a start of the drive of the heater.

6. The warming device according to claim 5, wherein
- the determination processing portion determines that a failure has occurred in one of the water level sensor and the temperature sensor when a determination result that is based on the detection result obtained by the water level sensor and a determination result that is based on the detection temperature obtained after the start of the drive of the heater differ, and
- the warming device comprises
- a second notification processing portion which, when it is determined by the determination processing portion that a failure has occurred in one of the water level sensor and the temperature sensor, notifies to that effect.

7. An image forming apparatus, comprising
- the warming device according to claim 1,
- wherein the image forming apparatus forms an image using ink warmed by the warming device.

8. A determination method executed in a warming device including a corrugated tube including a spiral portion that is formed spirally, a storing portion which stores the spiral portion and a liquid heating medium used for warming the spiral portion, a heater which heats the storing portion, and a water level sensor which detects a water level of the heating medium in the storing portion, the determination method comprising
- a determination step of determining, based on a detection result obtained by the water level sensor, whether or not the heating medium is in a heating medium shortage state where a storage amount of the heating medium in the storing portion falls below a predetermined lower limit amount.

* * * * *